US008792865B2

(12) United States Patent
Walker et al.

(10) Patent No.: US 8,792,865 B2
(45) Date of Patent: Jul. 29, 2014

(54) METHOD AND APPARATUS FOR ADJUSTING PACKET DATA CONTENT BY SENDING NULL PACKETS BASED ON TRANSMITTER SIGNAL CONDITION OR REQUIREMENT

(75) Inventors: Gordon Kent Walker, Poway, CA (US); Bruce Collins, San Diego, CA (US); Christopher R. Wingert, Del Mar, CA (US); Jai N. Subrahmanyam, Santa Clara, CA (US); Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 958 days.

(21) Appl. No.: 11/612,453

(22) Filed: Dec. 18, 2006

(65) Prior Publication Data

US 2008/0002611 A1    Jan. 3, 2008

Related U.S. Application Data

(60) Provisional application No. 60/817,877, filed on Jun. 29, 2006.

(51) Int. Cl.
*H04M 3/42* (2006.01)
*H04W 24/00* (2009.01)
*H04L 29/06* (2006.01)
*H04L 12/18* (2006.01)
*H04W 28/04* (2009.01)

(52) U.S. Cl.
CPC ........ *H04L 29/06027* (2013.01); *H04L 65/605* (2013.01); *H04W 28/04* (2013.01); *H04L 65/602* (2013.01); *H04L 12/189* (2013.01); *H04L 12/1868* (2013.01)

USPC ........................................ 455/414.1; 455/423

(58) Field of Classification Search
USPC ................ 370/328; 722/32, 35, 36; 455/3.01, 455/414.2, 414.3
See application file for complete search history.

(56) References Cited

U.S. PATENT DOCUMENTS 6,147,694 A * 11/2000 Osaki ............................ 345/473
6,701,355 B1 * 3/2004 Brandt et al. .................. 709/219
6,879,581 B1 * 4/2005 Leung ........................... 370/352

(Continued)

FOREIGN PATENT DOCUMENTS

| JP | 2007536813 | 12/2007 |
| WO | 0124421 | 4/2001 |
| WO | 2005109918 | 11/2005 |

OTHER PUBLICATIONS

International Search Report, ISR/PCT/US07/071747—International Search Authority—European Patent Office—Nov. 28, 2007.

(Continued)

*Primary Examiner* — George Eng
*Assistant Examiner* — Edd Rianne Plata
(74) *Attorney, Agent, or Firm* — Arent Fox LLP

(57) ABSTRACT

Systems and methods are provided for mitigating interference in a wireless network to facilitate network performance. In an aspect, a method for transmitting wireless data packets is provided. The method includes receiving data packets from a wireless distribution network. The data packets are analyzed to determine if a subset of the data packets are to be suppressed in view of transmitter signal conditions and substituting null packets for the subset of data packets if the subset of data packets are determined to be suppressed.

127 Claims, 10 Drawing Sheets

(56) References Cited

U.S. PATENT DOCUMENTS

| | | |
|---|---|---|
| 7,062,048 B2 | 6/2006 | Livaditis et al. |
| 7,203,758 B2 | 4/2007 | Cook |
| 7,228,154 B2 | 6/2007 | Champion |
| 7,460,082 B2 | 12/2008 | Li |
| 7,468,979 B2 | 12/2008 | Ricciulli |
| 7,574,448 B2 | 8/2009 | Volk |
| 2003/0018966 A1* | 1/2003 | Cook et al. .......... 725/2 |
| 2004/0001530 A1* | 1/2004 | Lyle et al. .......... 375/132 |
| 2004/0148501 A1* | 7/2004 | Livaditis et al. .......... 713/161 |
| 2004/0202190 A1* | 10/2004 | Ricciulli .......... 370/410 |
| 2004/0254958 A1* | 12/2004 | Volk .......... 707/104.1 |
| 2005/0141559 A1* | 6/2005 | Choi et al. .......... 370/469 |
| 2005/0146470 A1* | 7/2005 | Li et al. .......... 343/702 |
| 2005/0220027 A1 | 10/2005 | Setton et al. |
| 2005/0234735 A1* | 10/2005 | Williams .......... 705/1 |
| 2006/0092893 A1* | 5/2006 | Champion et al. .......... 370/338 |
| 2007/0002870 A1* | 1/2007 | Pekonen et al. .......... 370/395.42 |

OTHER PUBLICATIONS

Written Opinion, PCT/US2007/071747, International Searching Authority, European Patent Office, Nov. 28, 2007.

Taiwan Search Report—TW096123912—TIPO—Mar. 7, 2011.

* cited by examiner

METHOD AND APPARATUS FOR ADJUSTING PACKET DATA CONTENT BY SENDING NULL PACKETS BASED ON TRANSMITTER SIGNAL CONDITION OR REQUIREMENT

CLAIM OF PRIORITY UNDER 35 U.S.C. §119

This application claims the benefit of U.S. Provisional Patent Application Ser. No. 60/817,877, filed on Jun. 29, 2006, entitled "MANAGING NULL PACKETS" the entirety of which is incorporated herein by reference.

BACKGROUND

I. Field

The subject technology relates generally to communications systems and methods, and more particularly to systems and methods that adjust packet data content based on network conditions in a forward link only wireless network.

II. Background

Forward Link Only (FLO) is a digital wireless technology that has been developed by an industry-led group of wireless equipment and service providers. The FLO technology was designed in one case for a mobile multimedia environment and exhibits performance characteristics suited for use on cellular handsets. It uses advances in coding and interleaving to achieve high-quality reception, both real-time content streaming and other data services. FLO technology can provide robust mobile performance and high capacity without compromising power consumption. The technology also reduces the network cost of delivering multimedia content by dramatically decreasing the number of transmitters needed to be deployed. In addition, FLO technology-based multimedia multicasting complements wireless operators' cellular network data and voice services, delivering content to the same cellular handsets used on 3G networks, for example.

The FLO wireless system has been designed to broadcast real time audio and video signals, apart from non-real time services to mobile users. The respective FLO transmission is carried out using tall and high power transmitters to ensure wide coverage in a given geographical area. Further, it is common to deploy 3-4 transmitters in most markets to ensure that the FLO signal reaches a significant portion of the population in a given market. During the acquisition process of a FLO data packet several determinations and computations are made to determine such aspects as frequency offsets for the respective wireless receiver. Given the nature of FLO broadcasts that support multimedia data acquisitions, efficient processing of such data and associated overhead information is paramount. For instance, when determining frequency offsets or other parameters, complex processing and determinations are required where determinations of phase and associated angles are employed to facilitate the FLO transmission and reception of data.

Wireless communication systems such as FLO are designed to work in a mobile environment where the channel characteristics in terms of the number of channel taps with significant energy, path gains and the path delays are expected to vary quite significantly over a period of time. In an Orthogonal Frequency Division Multiplexing (OFDM) system in which FLO technology is related, a timing synchronization block in the receiver responds to changes in the channel profile by selecting the OFDM symbol boundary appropriately to maximize the energy captured in the FFT window. When such timing corrections take place, it is important that the channel estimation algorithm takes the timing corrections into account while computing the channel estimate to be used for demodulating a given OFDM symbol.

In addition to timing considerations, noise and transmission quality issues have to be accounted for in a given wireless network. In a single frequency network (SFN) such as can be provided by a FLO system, there are multiple SFNs in general. Particularly, there are both local area SFNs and wide area SFNs, where transmitters in the network are connected by multiple communication links. The data for a given SFN is generally desired to be the same, however in the presence of errors in the communications links that connect the transmitters these errors can contaminate the SFN. Similarly, if content is blacked out in one SFN, but active in another there can be destructive interference to a non-blacked out area, if the blacked out area radiates random or differently encrypted data in the blacked content's place.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Systems and methods are provided for managing broadcast information under various conditions in forward link only wireless networks. In one example condition, wireless transmitters receive packet information from a distribution layer or network. The packet information can be verified via a cyclic redundancy check (CRC) or other verification procedure. If a corrupted packet is detected via CRC or other method, physical layer information is not subsequently transmitted and thus radiated from respective transmitters to receivers across the wireless network. By suppressing transmission of corrupted information in this manner, network performance can be enhanced by mitigating interference in a single frequency network. Alternatively, random data can be transmitted over the physical layer if errors are detected at the transmitters to facilitate network performance. In another example condition, blackout requirements for a network transmission are considered. In this aspect, certain areas of a wireless transmission may be subject to blackout of designated data content for a given geographical area. In these cases, null data packets can be substituted for the blackout content on the physical layer, where such information is not radiated as described above. Alternatively, random data may be provided on the physical layer for the areas subject to blackout. Similar to the case where error packets are detected, by suppressing transmission of data to blacked-out areas, network performance can be enhanced.

To the accomplishment of the foregoing and related ends, certain illustrative embodiments are described herein in connection with the following description and the annexed drawings. These aspects are indicative of various ways in which the embodiments may be practiced, all of which are intended to be covered.

DETAILED DESCRIPTION

Systems and methods are provided for mitigating interference in a wireless network to facilitate network performance. In an aspect, a method for transmitting wireless data packets is provided. The method includes receiving data packets from a wireless distribution network. The data packets are analyzed to determine if a subset of the data packets are to be suppressed in view of transmitter signal conditions and substituting null packets for the subset of data packets if the subset of data packets are determined to be suppressed. In general, a null packet can be inserted within wireless transmissions that serve multiple applications. Such packets can be employed to mitigate potential interference within a Wide Area Operations Infrastructure (WOI) or Local Area Operations Infrastructure (LOI) Single Frequency Network (SFN), when the data available is inappropriate to the market or corrupted, where several applications can be provided to process such data. These applications include erred data packet suppression and blacked out programming suppression. In some examples, the use of random data for a supplanted packet is an alternate approach that may be applied under certain conditions according to the desired effect.

As used in this application, the terms "component," "network," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

Figure 1:
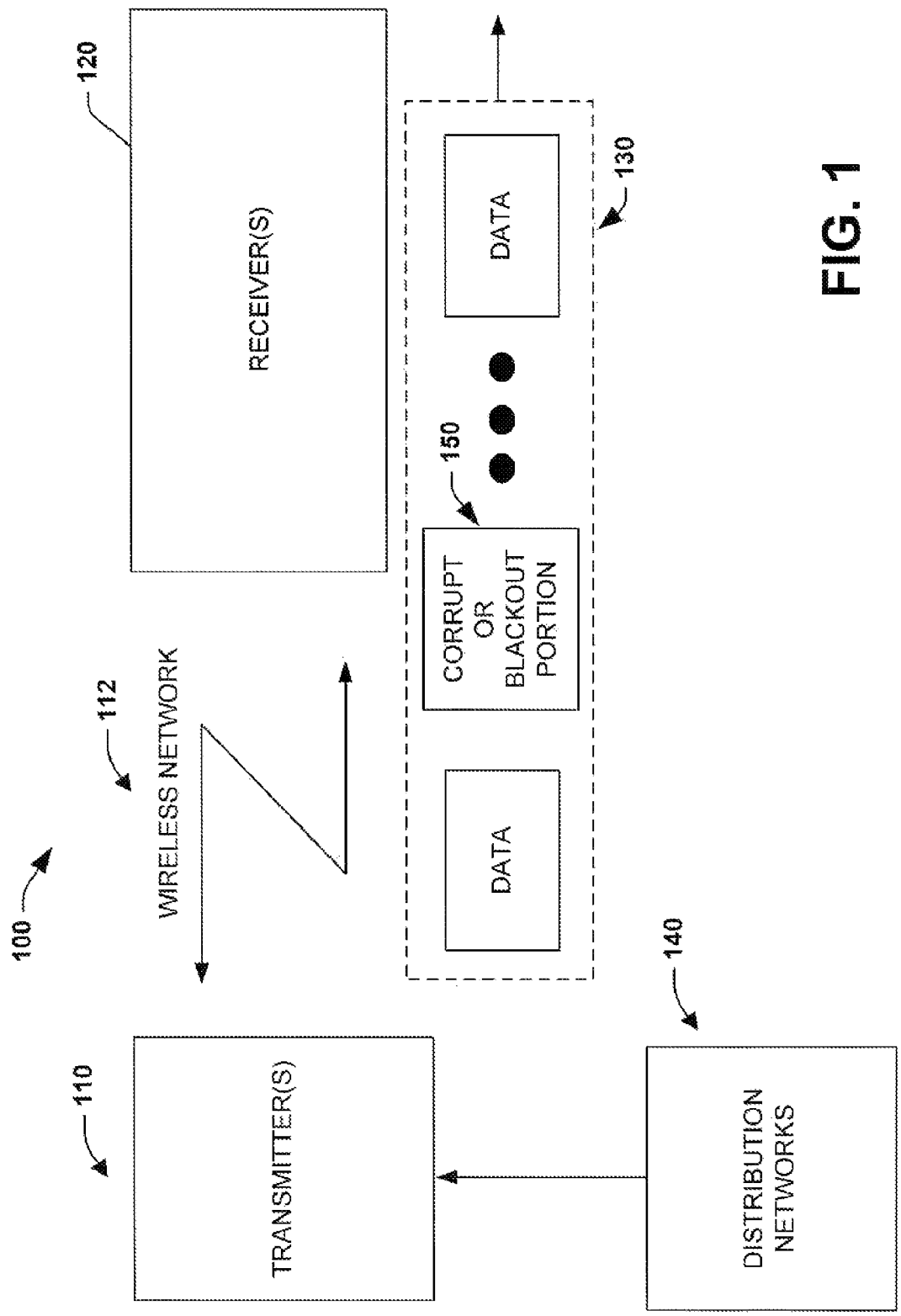
FIG. 1 is a schematic block diagram illustrating dynamic data management for a wireless network.

FIG. 1 illustrates a wireless network system 100 for dynamic data packet management in a wireless network. The system 100 includes one or more transmitters 110 that communicate across a wireless network 112 to one or more receivers 120. The receivers 120 can include substantially any type of communicating device such as a cell phone, computer, personal assistant, hand held or laptop devices, and so forth.

Portions of the receiver 120 are employed to decode a data symbol subset 130 and other data such as multimedia data. The symbol subset 130 is generally transmitted in an orthogonal Frequency Division Multiplexing (OFDM) network that employs forward link only (FLO) protocols for multimedia data transfer. Channel estimation is generally based on uniformly spaced pilot tones inserted in the frequency domain, and in respective OFDM symbols. The pilots are spaced 8 carriers apart, and the number of pilot carriers may be set at 512, for example in a system with 4096 total carriers.

In general, the transmitters 110 receive data packets from a distribution network 140, wherein the respective transmitters may apply one or more methods or algorithms to determine the data set 130 that is transmitted. In one aspect, data from the distribution networks 140 is tested to determine whether or not a data corruption has occurred. Such test could include a cyclic redundancy check (CRC), check sum, decryption of a code, error correction code or other method to determine whether the packet has become corrupted. If a corruption has been detected, a portion of the data set illustrated at 150 (e.g., physical layer) may be suppressed and in fact not radiated to the receivers 120. In an alternative aspect, when a corruption has been detected, random data may be supplied at 150. In this manner, network performance can be enhanced by mitigating potential interference problems caused by radiating corrupt data packets. In yet another aspect, portions of the data sent from the distribution networks 140 to the transmitters 110, may be designated as blackout data for specified geographical areas. In these applications, null data or random data information may be substituted at 150.

Before proceeding, the following terms are provided:

Designated Market Area (DMA)—A DMA includes counties (or other region designation) whose largest viewing share is given to broadcast stations of that same market area. This area could also be identified by zip codes, for example.

Local Area Operations Infrastructure (LOI)—An LOI is a collection of one or more transmitters operating as a Single Frequency Network (SFN) with common programming for a DMA, or similar metropolitan area.

Physical Layer Packet (PLP)—A Physical Layer Packet is a turbo encoded data packet including overhead data carried in a Physical Layer Container (PLC).

Null Packet—A PLP that has no data in it and does not result in radiated carriers.

Wide Area Operations Infrastructure (WOI)—A WOI is a collection of DMAs operating as an SFN with common programming.

Generally, several applications/implementations for null carrier packets have been identified. One application reduces the adverse impact of communication errors on the overall system performance. Another application improves the security (effectiveness) of a programming blackout by eliminating a potential attack, and reduces interference to the adjacent DMA/LOI, of the non-blacked out content. If the un-blacked out content is available too far into the blacked out LOI/DMA, a random packet method may be applied to reduce the coverage area of the adjacent market signal within the blacked out market.

If one or more of the communication links is lost, it may not be acceptable to radiate only the LOI or the WOI content, which is a possible net effect of the null packet method. Under these circumstances the random packet method can be applied, automatically. For instance, when N consecutive packets have been received in error at the transmitter 110, the transmitter starts sending random packets instead. Similarly, the null packet method is re-enabled if K consecutive valid packets have been received at the transmitter.

Within the network 112, there can be multiple communications links, these include, but are not limited to satellite, and terrestrial microwave links, WAN, and LAN wired networks. Corruption of an individual or multiple PLPs during transmission over one of these links is possible. When an uncorrectable packet is detected at the transmitter 110, the specific PLP that is impacted is not radiated in the data packet 130. Thus, the time and frequency allocated to the packet in the physical layer has no RF carriers in the data packet 130. This precaution is taken since due to the SFN nature of the network 112, an erred packet can interfere with rest of the network 112. An alternative is to radiate a random data packet, with an attendant loss in SFN performance.

In another embodiment, the system 100 supports the blackout of program content that is contractually disallowed within an LOI/DMA network. This content is typically included within WOI multiplex, and would normally be radiated with the rest of the WOI service area data at 130. Under blackout conditions, there is replacement programming provided within the impacted LOI, as part of the LOI multiplex. The blackout programming is suppressed in the WOI portion of the blacked out LOI's multiplex. This reduces the likelihood of a successful program key redistribution attack utilizing keys obtained from a LOI/DMA that is not subject to the blackout. An alternative is to radiate random data packets for the blacked out content, with an attendant loss in SFN performance. It is noted that the type of data suppression technique employed can be dynamically selected but in general, one or the other technique is selected during an initialization process. For example, in some instances, it may be desirable to switch between null packet generation or random data generation depending on detected circumstances and/or system conditions.

Figure 2:
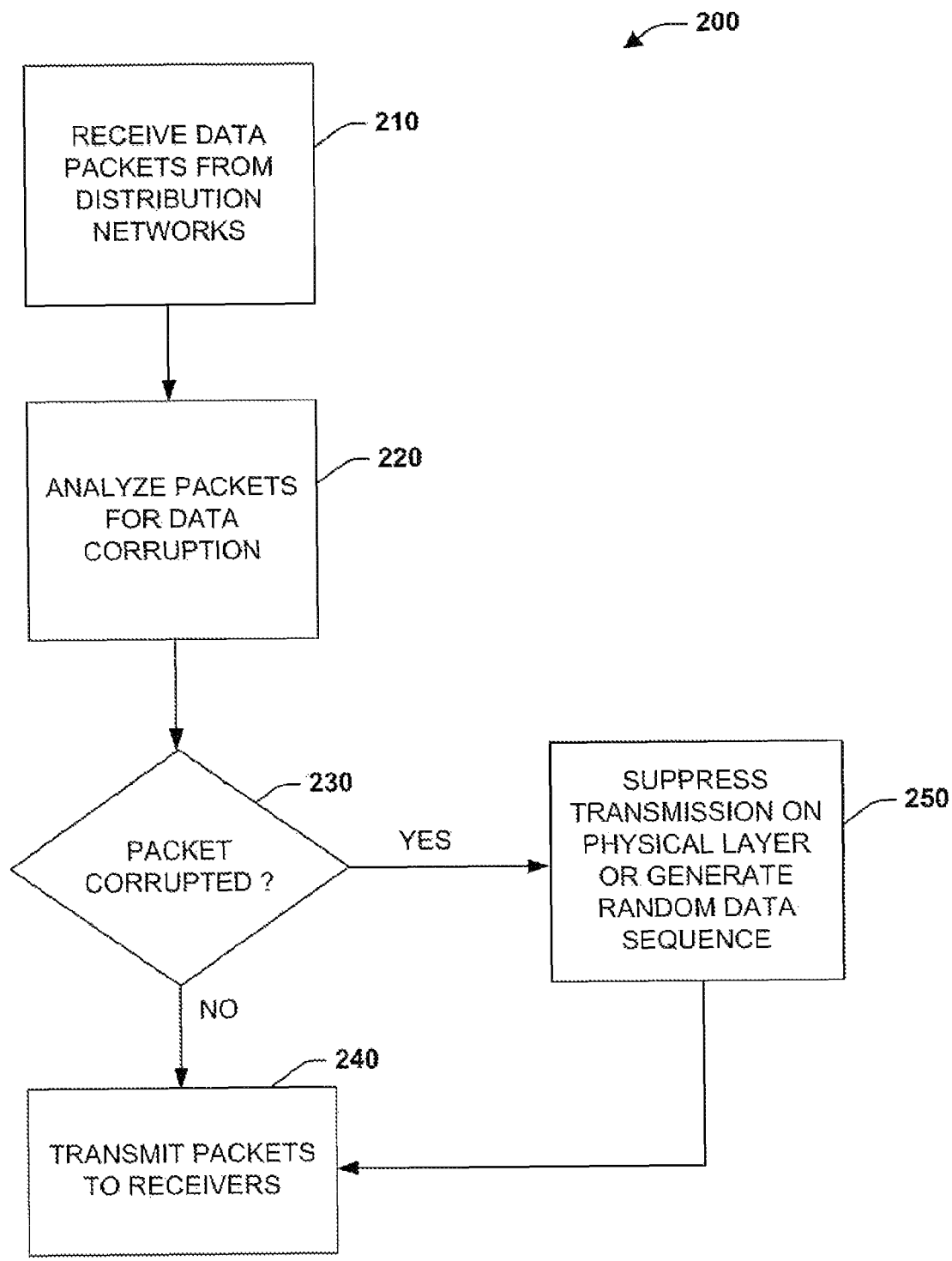
FIG. 2 is a flow diagram illustrating a data transmission process for corrupt data packet transmissions.
Figure 3:
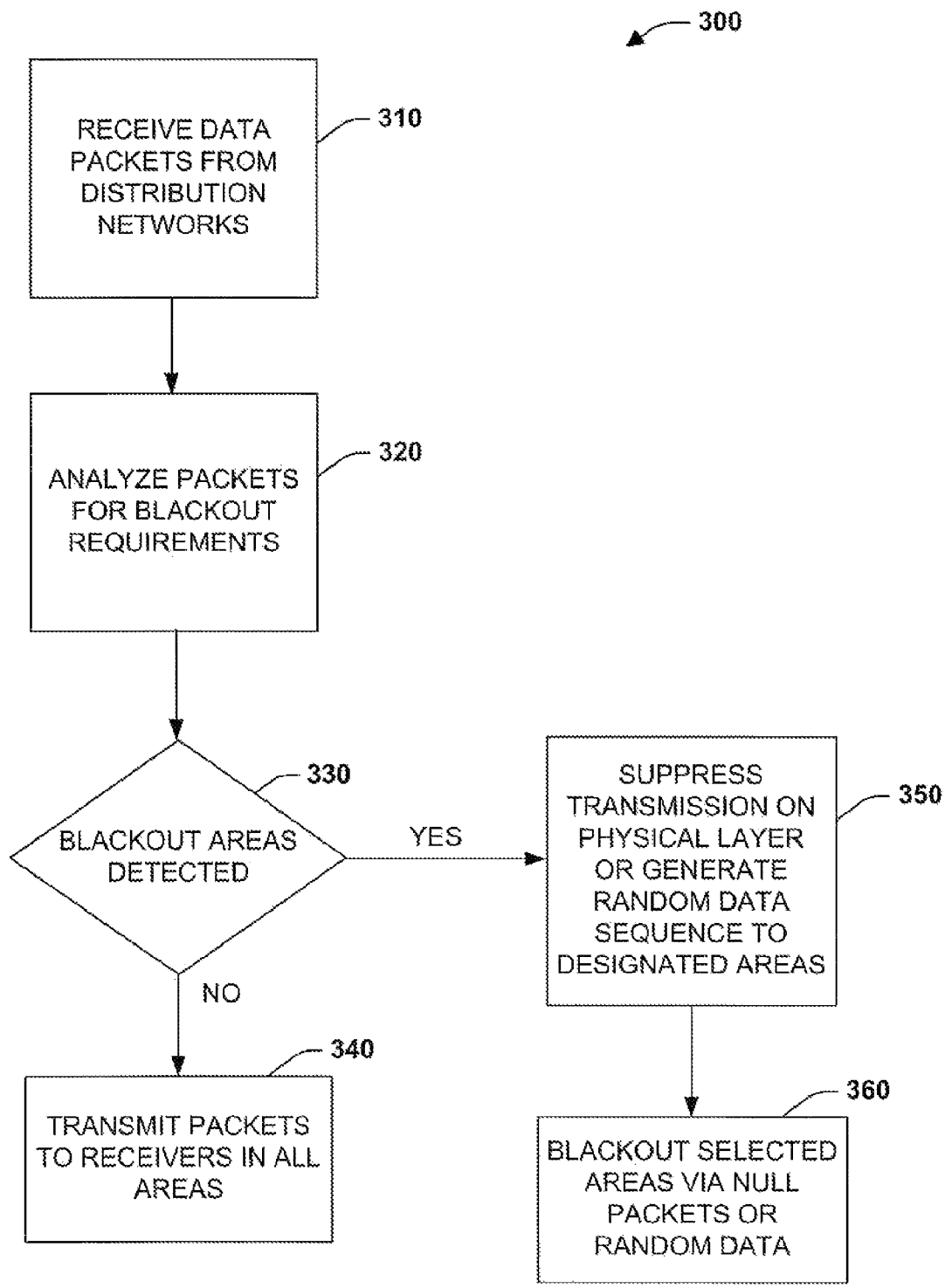
FIG. 3 is a flow diagram illustrating a data transmission process for blackout data packet transmissions.

FIGS. 2 and 3 illustrate data transmission processes for wireless systems. While, for purposes of simplicity of explanation, the methodologies are shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series on interrelated states or events, such as in a state diagram. Moreover, not all illustrated acts may be required to implement a methodology in accordance with the subject methodologies disclosed herein.

FIG. 2 illustrates a data transmission process 200 for corrupt data packet transmissions. Proceeding to 210, data packets are received at one or more transmitters from a distribution network or layer. At 220, the received packets are analyzed for potential data corruptions. As noted previously, substantially any type of data verification scheme can be employed. For example, a CRC algorithm can be run on the respective data packets to determine a data corruption. At 230, a determination is made as to whether or not a data packet corruption has been detected at a respective transmitter as received from the distribution network. If no corruption shave been detected at 230, the process proceeds to 240 and transmits the received data packets to one or more receivers. If a data packet corruption is detected at 230, the process proceeds to 250, where null packets are inserted into a data set or random sequences are generated for the corrupted data. As noted above, the null sequences and/or random data can be applied to the physical layer of a respective data set.

FIG. 3 illustrates a data transmission process 300 for blackout data packet transmissions. Proceeding to 310, similar to above, data packets are received at one or more transmitters from a distribution network or layer. At 320, the received packets are analyzed for potential blackout requirements. As noted previously, substantially any type of data verification scheme can be employed. This can include codes or flags that indicate a data subset which is designated for a geographical area is to be blacked out with respect to data transmissions for other geographical areas. At 330, a determination is made as to whether or not a data packet that has been detected at a respective transmitter as received from the distribution network is to have some of the data tagged for blackout requirements per a given geographical area. If no data is to be blacked out at 330, the process proceeds to 340 and transmits the received data packets to one or more receivers in the respective transmission network. If a data packet is to have some data blacked out at 330, the process proceeds to 350, where null packets are inserted into a data set or random sequences are generated for the area data so designated for black out. At 360, data for non-blacked out areas is transmitted to the respective geographical areas that are not designated for blackout. Data that is subject to blackout requirements is transmitted with null or random data at the physical layer as previously described.

Figure 4:
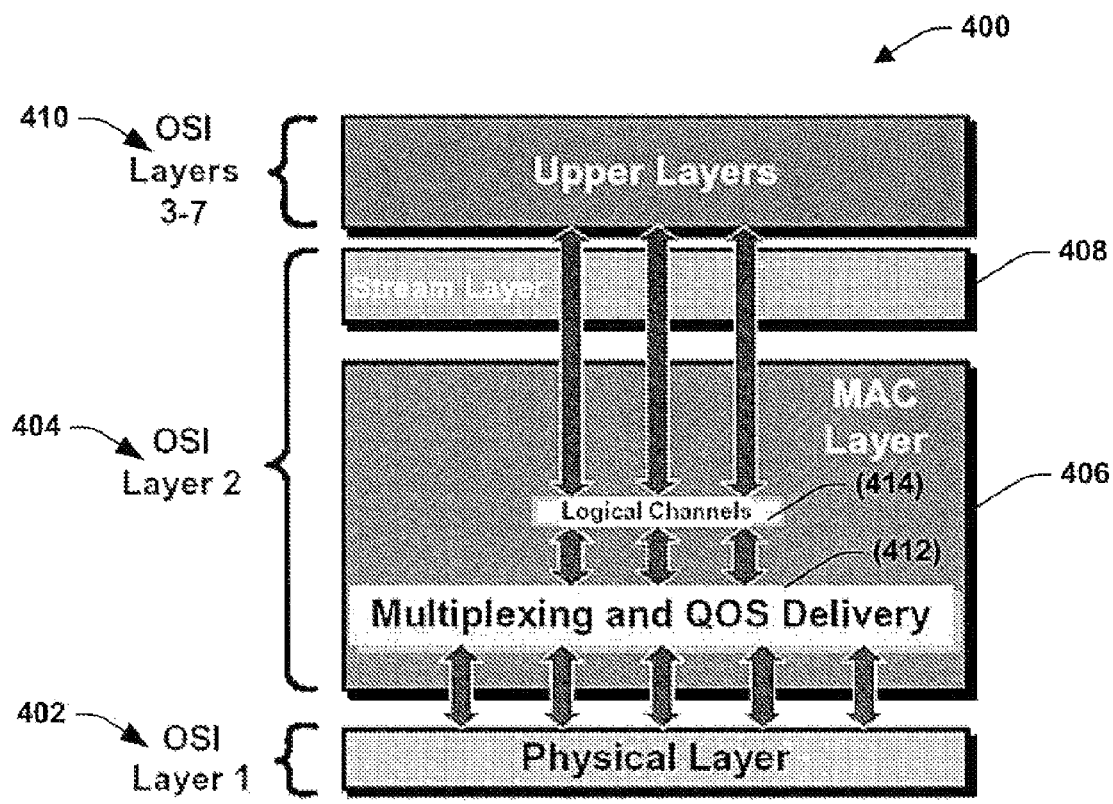
FIG. 4 is a diagram illustrating example network layers for a wireless system.

FIG. 4 illustrates example network layers 400 for a wireless system where data received there from may be employed in the frequency blocks described above. Generally, the FLO air interface specification covers protocols and services corresponding to Open Systems Interconnect (OSI) networking model having Layers 1 (physical layer) 402 and Layer 2 (Data Link layer) 404. The Data Link layer is further subdivided into two sub-layers, namely, Medium Access (MAC) sub-layer 406, and Stream sub-layer 408. Upper Layers 410 include OSI layers 3-7 and can include compression of multimedia content, access control to multimedia, along with content and formatting of control information. The MAC layer 406 includes multiplexing and Quality of Service (QoS) delivery functions 412. The MAC layer 406 also includes logical channels 414.

The FLO air interface specification typically does not specify the upper layers to allow for design flexibility in support of various applications and services. These layers are shown to provide context. The Stream layer includes multiplexes up to three upper layer flows into one logical channel, binding of upper layer packets to streams for each logical channel, and provides packetization and residual error handling functions. Features of the Medium Access Control (MAC) Layer includes controls access to the physical layer, performs the mapping between logical channels and physical channels, multiplexes logical channels for transmission over the physical channel, de-multiplexes logical channels at the mobile device, and/or enforces Quality of Service (QOS) requirements. Features of Physical Layer include providing channel structure for the forward link, and defining frequency, modulation, and encoding requirements.

In general, FLO technology utilizes Orthogonal Frequency Division Multiplexing (OFDM), which is also utilized by Digital Audio Broadcasting (DAB), Terrestrial Digital Video Broadcasting (DVB-T), and Terrestrial Integrated Services Digital Broadcasting (ISDB-T). Generally, OFDM technology can achieve high spectral efficiency while effectively meeting mobility requirements in a large cell SFN. Also, OFDM can handle long delays from multiple transmitters with a suitable length of cyclic prefix; a guard interval added to the front of the symbol (which is a copy of the last portion of the data symbol) to facilitate orthogonality and mitigate inter-carrier interference. As long as the length of this interval is greater than the maximum channel delay, reflections of previous symbols are removed and the orthogonality is preserved.

Figure 5:
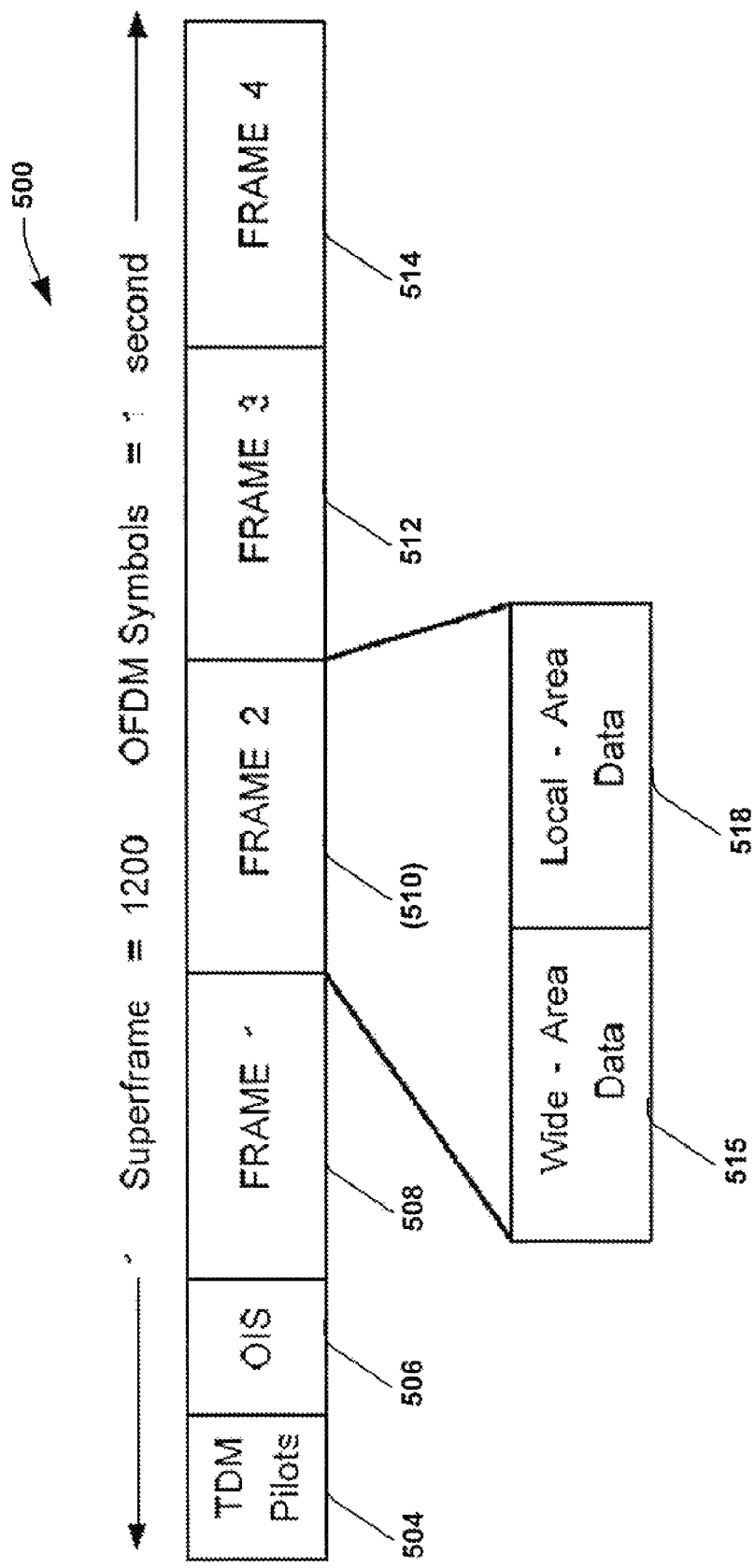
FIG. 5 is a diagram illustrating an example data structure and signal for a wireless system.

Proceeding to FIG. 5, a FLO physical layer superframe 500 is illustrated. In an embodiment, a superframe is about equal to 1200 OFDM symbols with a one second time duration. The FLO physical layer uses a 4K mode (yielding a transform size of 4096 sub-carriers), providing superior mobile performance compared to an 8 K mode, while retaining a sufficiently long guard interval that is useful in fairly large SFN cells. Rapid channel acquisition can be achieved through an optimized pilot and interleaver structure design. The interleaving schemes incorporated in the FLO air interface facilitate time diversity. The pilot structure and interleaver designs optimize channel utilization without annoying the user with long acquisition times. Generally, FLO transmitted signals are organized into super frames as illustrated at 500. Each super frame is comprised of four frames of data, including TDM pilots (Time Division Multiplexed) 504, Overhead Information Symbols (OIS) 506 and frames 508, 510, 512, 514, containing wide-area 516 and local-area data 518. The TDM pilots are provided to allow for rapid acquisition of the OIS. The OIS describes the location of the data for each media service in the super frame.

Typically, each super frame consists of 200 OFDM symbols per MHz of allocated bandwidth (1200 symbols for 6 MHz), and each symbol contains 7 interlaces of active sub-carriers. Each interlace is uniformly distributed in frequency, so that it achieves the full frequency diversity within the available bandwidth. These interlaces are assigned to logical channels that vary in terms of duration and number of actual interlaces used. This provides flexibility in the time diversity achieved by any given data source. Lower data rate channels can be assigned fewer interlaces to improve time diversity, while higher data rate channels utilize more interlaces to minimize the ratio's on-time and reduce power consumption.

The acquisition time for both low and high data rate channels is generally the same. Thus, frequency and time diversity can be maintained without compromising acquisition time. Most often, FLO logical channels are used to carry real-time (live streaming) content at variable rates to obtain statistical multiplexing gains possible with variable rate codecs (Compressor and Decompressor in one). Each logical channel can have different coding rates and modulation to support various reliability and quality of service requirements for different applications. The FLO multiplexing scheme enables device receivers to demodulate the content of the single logical channel it is interested in to minimize power consumption. Mobile devices can demodulate multiple logical channels concurrently to enable video and associated audio to be sent on different channels.

Error correction and coding techniques can also be employed. Generally, FLO incorporates a turbo inner code 13 and a Reed Solomon (RS) 14 outer code. Typically, the turbo code packet contains a Cyclic Redundancy Check (CRC). The RS code need not be calculated for data that is correctly received, which, under favorable signal conditions, results in additional power savings. Another aspect is that the FLO air interface is designed to support frequency bandwidths of 5, 6, 7, and 8 MHz, for example. A highly desirable service offering can be achieved with a single Radio Frequency channel.

Figure 6:
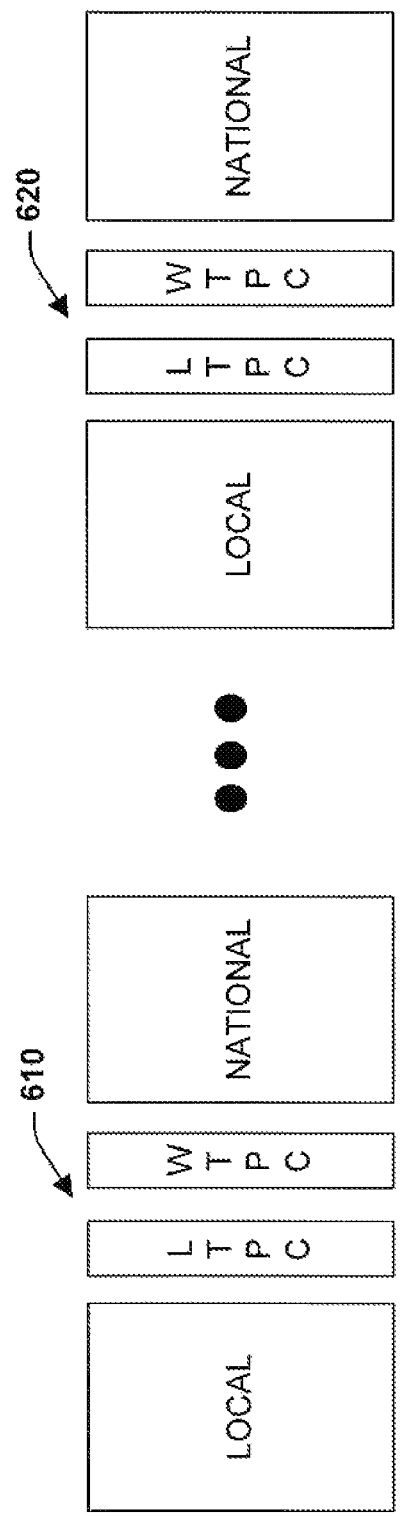
FIG. 6 is a diagram illustrating an alternative data structure for local and wide areas in a wireless network.

FIG. 6 illustrates an alternative data structure 600 for local and wide areas in a wireless network. In this embodiment, additional pilot symbols can be employed between local area and wide area data boundaries. This is illustrated at 610 and 620 where a Local area Transitional Pilot Channel (LTPC) and a wire-area Transitional Pilot Channel (WTPC) symbols are shown as a subset of symbols. As illustrated at 620, such groupings of LTPC and WTPC can appear between local area and wide area boundaries that appear in an OFDM structure. In general, LTPC would be employed to decode the last packet of the local area data structure where, the last local area symbol may be referred to as local area symbol L. Thus, a respective receiver can process a three symbol packet that includes local area symbol L, local area symbol L−1, and the respective LTPC to determine the last local area symbol L. If decoding for the first wide area symbol N, the three symbol packet for receiver decoding would be the WTPC, the first wide area symbol N, and the next wide area symbol N+1. It is to be appreciated, that more than two symbols can also be employed between local area and wide area data boundaries.

The symbol structure that is employed for LTPC and WTPC is similar to that of a normal data symbol. This includes eight slots that are occupied and the respective data symbols are all '0' before scrambling, where interlaces are a subset of carriers and slots are mapped to the interlaces in order to randomize filling of the interlaces. Scrambling seeds & masks, slot-to-interlace mapping and modulation symbol energies are similar as in a data symbol. In particular, the wide-area symbols—WTPC are scrambled using a wide-area ID in the seed, and the local area symbols—LTPC are scrambled using both the wide-area and local area IDs in the seed. In general, the receiver does not need to determine the symbol locations in one example modem implementation.

Figure 7:
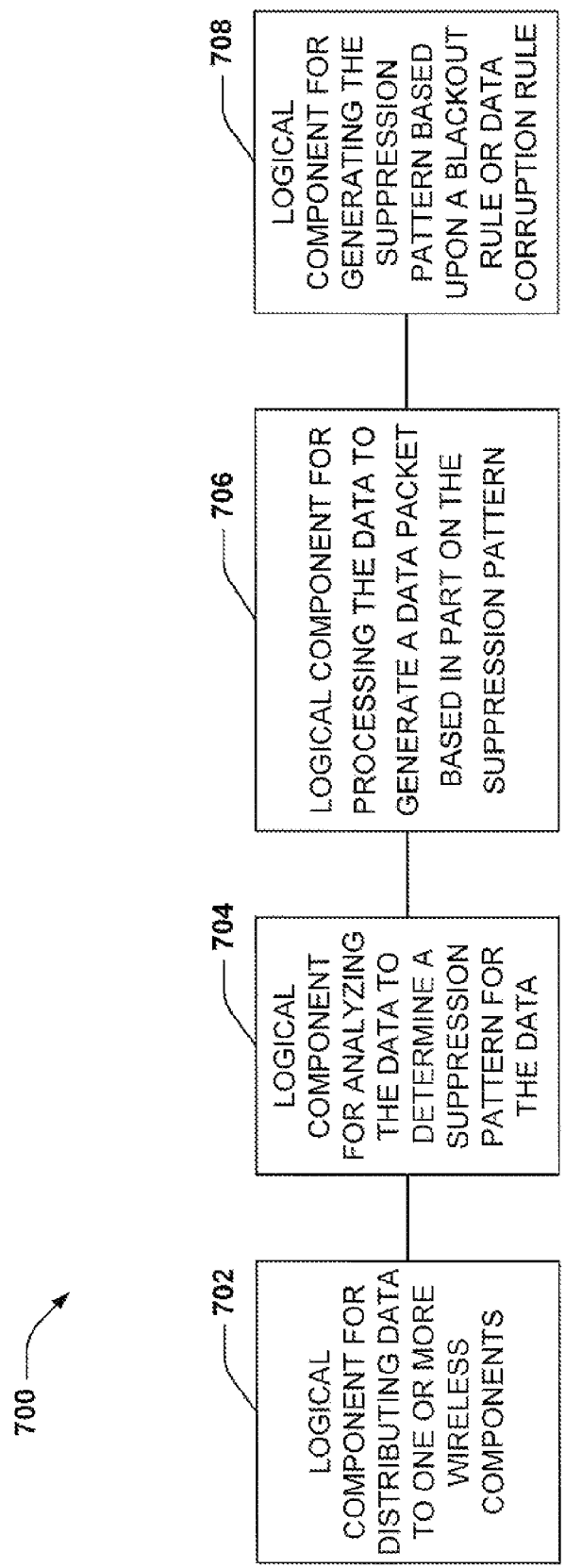
FIG. 7 is a diagram illustrating components for managing wireless data transmissions.

FIG. 7 illustrates a system 700 for managing data transmissions in a wireless network. System 700 is represented as including functional blocks, which may represent functions implemented by a processor, software, or combination thereof (e.g., firmware). System 700 may be implemented in a base station and/or receiver and may include a logical module for distributing data to one or more wireless components at 702. This can include one or more distribution layers or components that distribute data to one or more wireless transmitters. At 704, a logical module is provided for analyzing the data to determine a suppression pattern for the data. This can include software that defines an algorithm that checks the data for a corruption pattern, blackout patter, or other designation. At 706, a logical module is provided for processing the data to generate a data packet based in part on the suppression pattern. This can include a processor (or a bank of processors) that substitute a null pattern or random data structure into a transmission based in part on a corrupt data detection and/or rule that indicates a blackout pattern for a designated area. At 708, a logical module is provided for generating the suppression pattern based upon a blackout rule, data corruption rule, and/or other rule that specifies that null patterns and/or random data patterns are to be inserted into a respective wireless transmission.

Figure 8:
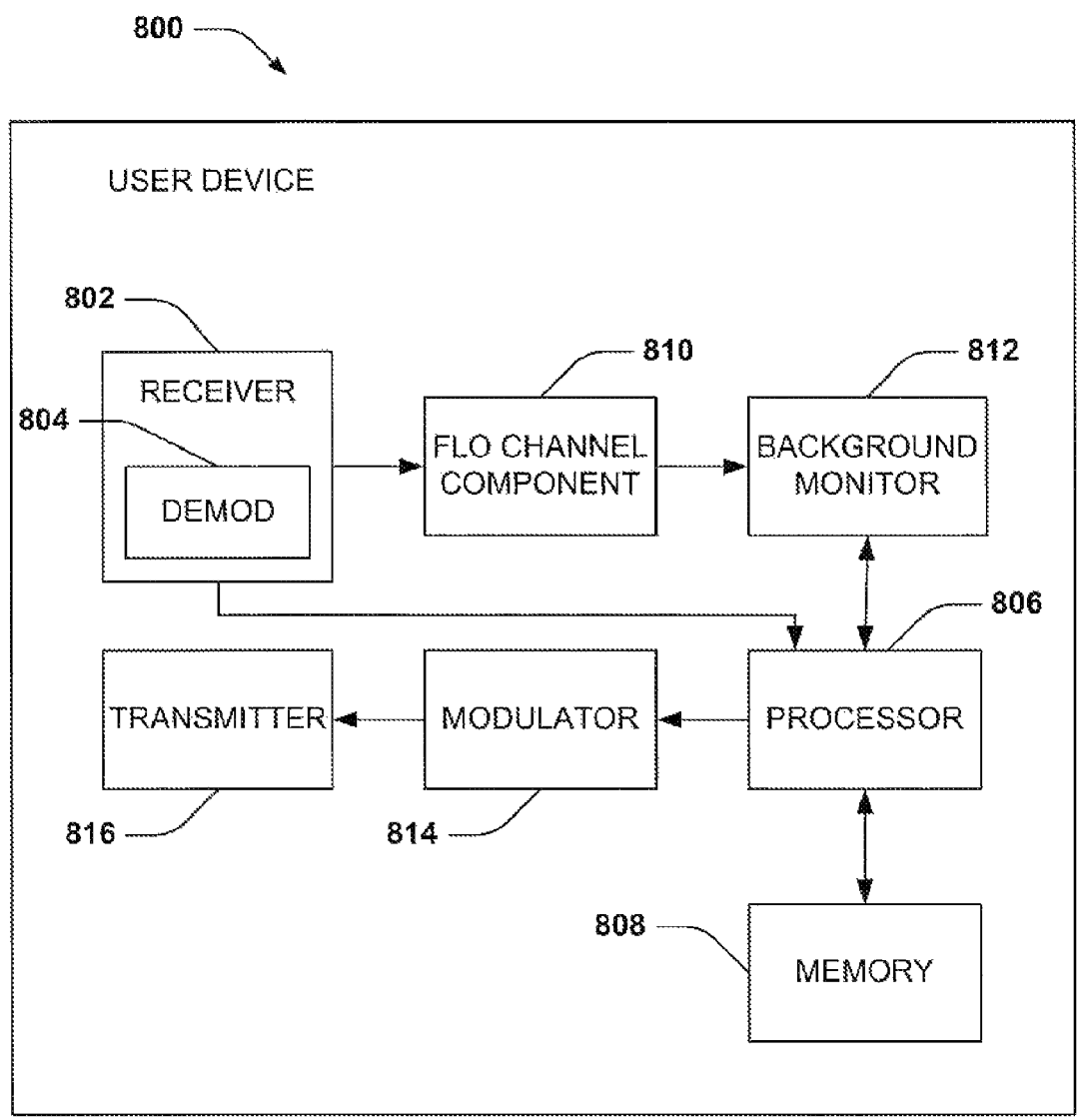
FIG. 8 is a diagram illustrating an example user device for a wireless system.

FIG. 8 is an illustration of a user device 800 that is employed in a wireless communication environment, in accordance with one or more aspects set forth herein. User device 800 comprises a receiver 802 that receives a signal from, for instance, a receive antenna (not shown), and performs typical actions thereon (e.g., filters, amplifies, down converts, etc.) the received signal and digitizes the conditioned signal to obtain samples. A demodulator 804 can demodulate and provide received pilot symbols to a processor 806 for channel estimation. A FLO channel component 810 is provided to process FLO signals as previously described. This can include digital stream processing and/or positioning location calculations among other processes. Processor 806 can be a processor dedicated to analyzing information received by receiver 802 and/or generating information for transmission by a transmitter 816, a processor that controls one or more components of user device 800, and/or a processor that both analyzes information received by receiver 802, generates information for transmission by transmitter 816, and controls one or more components of user device 800.

User device 800 can additionally comprise memory 808 that is operatively coupled to processor 806 and that stores information related to wireless network data processing. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory. User device 800 further comprises a background monitor 814 for processing FLO data, a symbol modulator 814 and a transmitter 816 that transmits the modulated signal.

Figure 9:
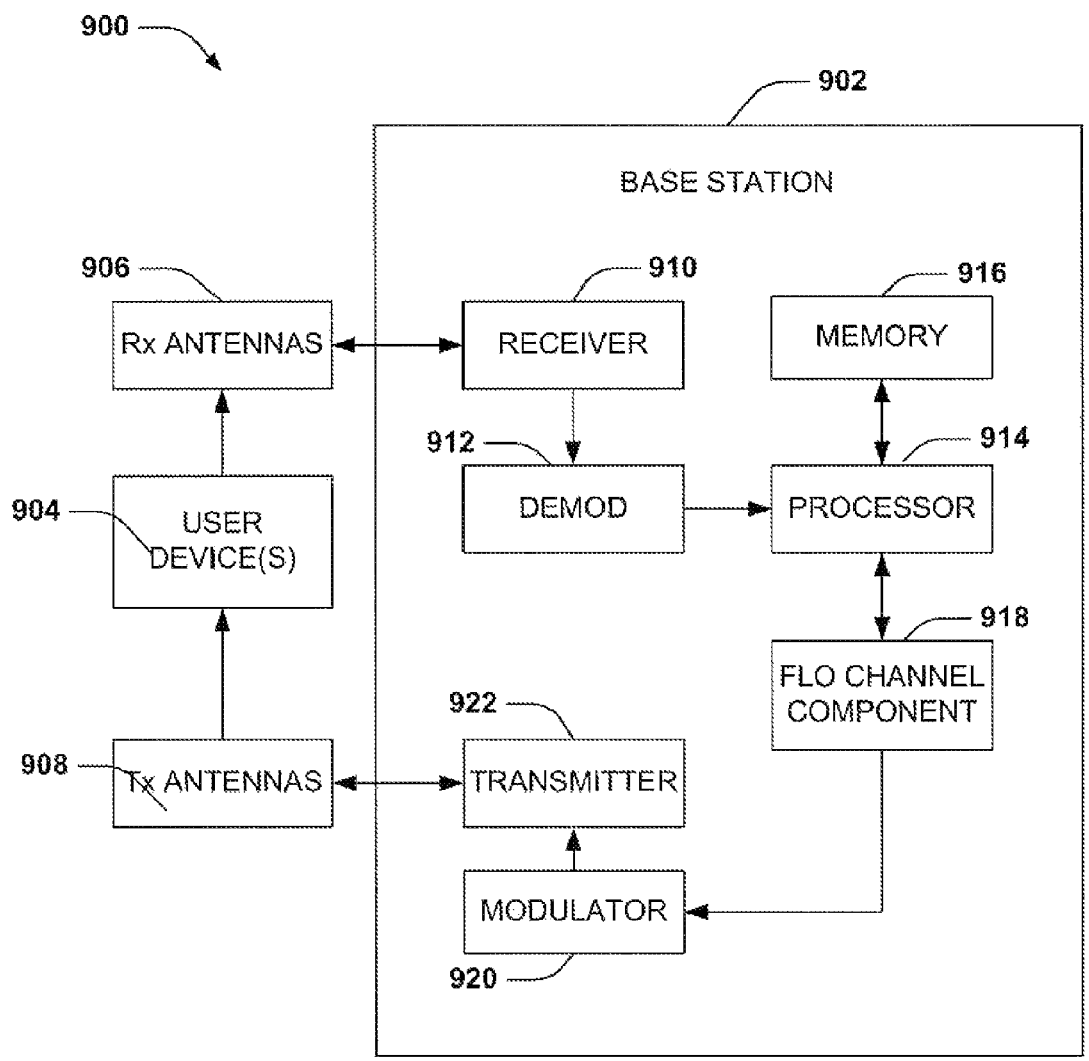
FIG. 9 is a diagram illustrating an example base station for a wireless system.

FIG. 9 is an illustrates an example system 900 that comprises a base station 902 with a receiver 910 that receives signal(s) from one or more user devices 904 through a plurality of receive antennas 906, and a transmitter 924 that transmits to the one or more user devices 904 through a transmit antenna 908. Receiver 910 can receive information from receive antennas 906 and is operatively associated with a demodulator 912 that demodulates received information. Demodulated symbols are analyzed by a processor 914 that is similar to the processor described above, and which is coupled to a memory 916 that stores information related to wireless data processing. Processor 914 is further coupled to a FLO channel 918 component that facilitates processing FLO information associated with one or more respective user devices 904.

A modulator 922 can multiplex a signal for transmission by a transmitter 924 through transmit antenna 908 to user devices 904. FLO channel component 918 can append information to a signal related to an updated data stream for a given transmission stream for communication with a user device 904, which can be transmitted to user device 904 to provide an indication that a new optimum channel has been identified and acknowledged.

Figure 10:
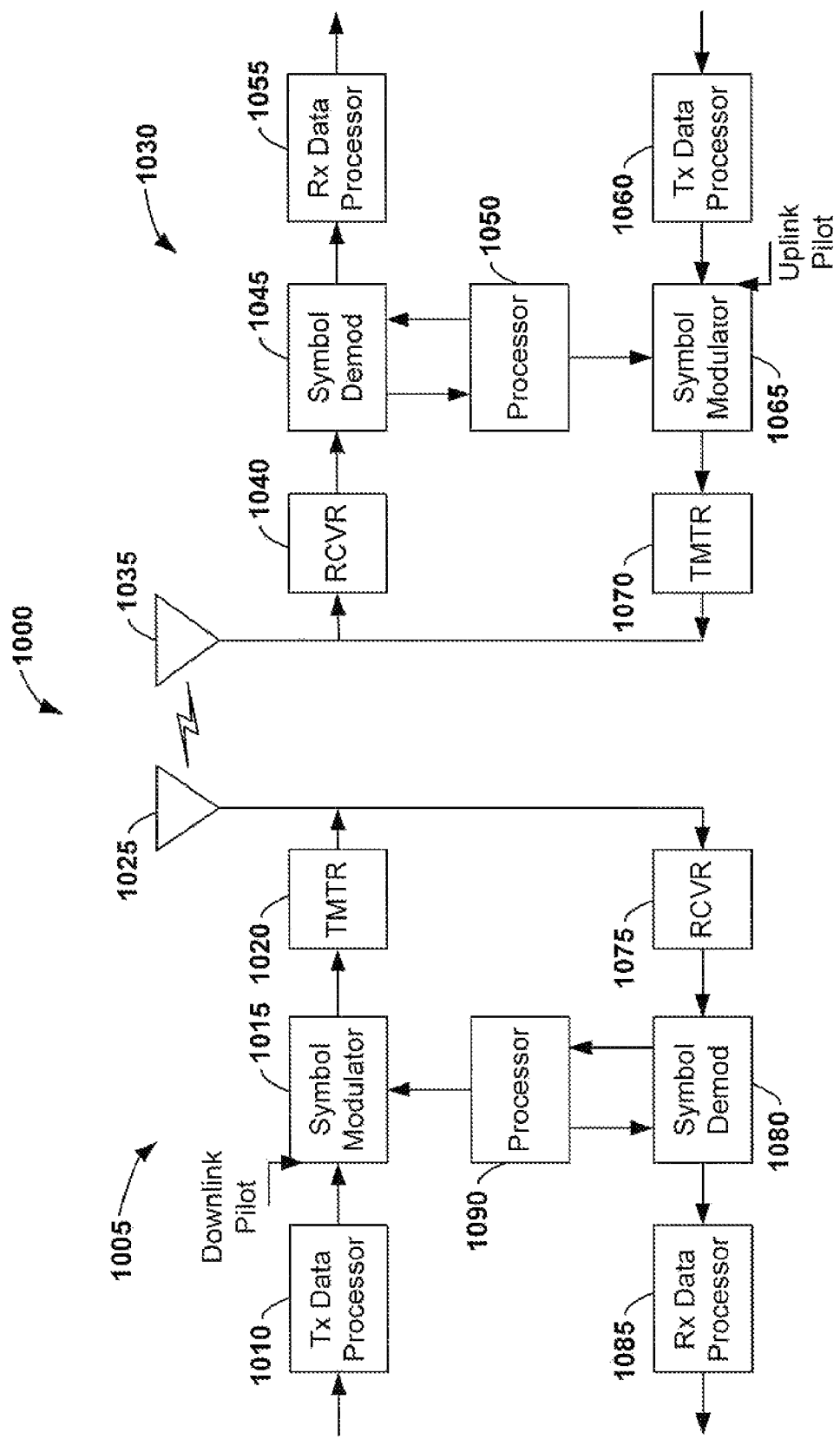
FIG. 10 is a diagram illustrating an example transceiver for a wireless system.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency up converts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency down converts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol de-maps), de-interleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

On the uplink, a TX data processor 1060 processes traffic data and provides data symbols. A symbol modulator 1065 receives and multiplexes the data symbols with pilot symbols, performs modulation, and provides a stream of symbols. A transmitter unit 1070 then receives and processes the stream of symbols to generate an uplink signal, which is transmitted by the antenna 1035 to the access point 1005.

At access point 1005, the uplink signal from terminal 1030 is received by the antenna 1025 and processed by a receiver unit 1075 to obtain samples. A symbol demodulator 1080 then processes the samples and provides received pilot symbols and data symbol estimates for the uplink. An RX data processor 1085 processes the data symbol estimates to recover the traffic data transmitted by terminal 1030. A processor 1090 performs channel estimation for each active terminal transmitting on the uplink. Multiple terminals may transmit pilot concurrently on the uplink on their respective assigned sets of pilot subbands, where the pilot subband sets may be interlaced.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for transmitting wireless data packets, comprising:
   receiving data packets from a wireless distribution network;
   analyzing the data packets to determine if a subset of the data packets have been corrupted;
   suppressing transmission of the subset of data packets, at the physical layer, if the subset of data packets is determined to have been corrupted;
   determining when N consecutive data packets have been received in error at a transmitter, where N is a positive integer greater than one;
   generating random data packets after the N consecutive packets have been received; and
   substituting the random data packets, instead of suppressing transmission of the subset of data packets, for the subset of data packets when N consecutive data packets have been received in error at the transmitter.

2. The method of claim 1, wherein the data packets are transmitted in an Orthogonal Frequency Division Multiplexing (OFDM) network.

3. The method of claim 1, further comprising employing an initialization routine to determine whether suppression of transmission or substitution of random data packets are to be employed when the subset of data packets is determined to be corrupted.

4. The method of claim 1, further comprising switching between suppression of transmission and random data packet substitution according to a specific application.

5. The method of claim 1, further comprising employing a suppression of transmission algorithm or a random data packet substitution algorithm at one or more wireless transmitters.

6. The method of claim 1, further comprising employing a cyclic redundancy check (CRC), check sum, error correction code or a decryption code to determine a data corruption.

7. The method of claim 1, further comprising performing a suppression of transmission or a random data packet substitution at an OFDM physical layer.

8. The method of claim 1, further comprising determining at least one of Designated Market Area (DMA), a group of local transmitters, a Physical Layer Packet (PLP), a suppression of transmission, a random data packet, and a group of wide area transmitters.

9. The method of claim 8, further compnsmg increasing security coverage of a programming blackout by mitigating a potential attack and reducing interference of an adjacent DMA or group of local transmitters of non-blacked out content.

10. The method of claim 9, further comprising determining if an unblacked out content is available too far into a blacked out group of local transmitters or DMA, then applying a random packet to reduce a coverage area of an adjacent market signal within a blacked out market.

11. The method of claim 1, further comprising re-enabling suppression of transmission if K consecutive valid packets have been received at a transmitter after substituting random data packets for the subset of data packets, where K is a positive integer.

12. The method of claim 11, further comprising generating data from multiple communications links that include at least one of satellite links, terrestrial microwave links, WAN networks, and LAN wired networks.

13. The method of claim 11, further comprising suppressing data in a group of wide area transmitters portion of a blacked out group of local transmitter's multiplex.

14. The method of claim 1, further comprising generating random data packets for the subset of data packets or suppressing transmission of the subset of data packets if the subset of data packets is determined to be subject to a blackout requirement.

15. The method of claim 1, further comprising determining at least one of Designated Market Area (DMA), a group of local transmitters, a Physical Layer Packet (PLP), a suppression of transmission, a random data packet, and a group of wide area transmitters.

16. The method of claim 15, further compnsmg increasing security coverage of a programming blackout by mitigating a potential attack and reducing interference of an adjacent DMA or group of local transmitters of non-blacked out content.

17. The method of claim 16, further comprising determining if an unblacked out content is available too far into a blacked out group of local transmitters or DMA, then applying a random packet to reduce a coverage area of an adjacent market signal within a blacked out market.

18. The method of claim 1, further comprising re-enabling suppression of transmission if K consecutive valid packets have been received at a transmitter after substituting random data packets for the subset of data packets, where K is a positive integer.

19. The method of claim 18, further comprising generating data from multiple communications links that include at least one of satellite links, terrestrial microwave links, WAN networks, and LAN wired networks.

20. The method of claim 18, further comprising suppressing data in a group of wide area transmitters portion of a blacked out group of local transmitter's multiplex.

21. A system for transmitting wireless data packets, comprising:
   means for receiving data packets from a wireless distribution network;
   means for analyzing the data packets to determine if a subset of the data packets are to be suppressed in view of data packet corruption;
   means for determining when N consecutive data packets have been received in error at a transmitter, where N is a positive integer greater than one;
   means for generating random data packets after the N consecutive data packets have been received; and
   means for substituting the random data packets, instead of suppressing transmission of the subset of data packets, when N consecutive data packets have been received in error.

22. The system of claim 21, further comprising means for employing an initialization routine to determine whether suppression of transmission or substitution of random data packets are to be employed when the subset of data packets is determined to be corrupted.

23. The system of claim 21, further comprising:
   means for switching between suppression of transmission and random data packet substitution according to a specific application.

24. The system of claim 21, further comprising:
   means for determining at least one of Designated Market Area (DMA), a group of local transmitters, a Physical Layer Packet (PLP), a suppression of transmission, a random data packet, and a group of wide area transmitters.

25. The system of claim 24, further comprising:
   means for increasing security coverage of a programming blackout by mitigating a potential attack and reducing interference of an adjacent DMA or group of local transmitters of non-blacked out content.

26. The system of claim 25, further comprising:
   means for determining if an un-blacked out content is available too far into a blacked out group of local transmitters or DMA, then applying a random packet to reduce a coverage area of an adjacent market signal within a blacked out market.

27. The system of claim 21, further comprising:
   means for re-enabling suppression of transmission if K consecutive valid packets have been received at the transmitter after substituting random data packets for the subset of data packets, where K is a positive integer.

28. The system of claim 27, further comprising means for generating data from multiple communications links that include at least one of satellite links, terrestrial microwave links, WAN networks, and LAN wired networks.

29. The system of claim 27, further comprising means for suppressing data in a group of wide area transmitters portion of a blacked out group of local transmitter's multiplex.

30. The system of claim 21, wherein the data packets are transmitted in an Orthogonal Frequency Division Multiplexing (OFDM) network.

31. The system of claim 19, further comprising means for employing a suppression of transmission algorithm or a random data packet substitution algorithm at one or more wireless transmitters.

32. The system of claim 21, further comprising means for employing a cyclic redundancy check (CRC), check sum, error correction code or a decryption code to determine a data corruption.

33. The system of claim 19, further comprising means for performing a suppression of transmission or a random data packet substitution at an OFDM physical layer.

34. A non-transitory machine readable medium having machine executable instructions stored thereon, comprising:
   receiving data packets from a wireless distribution network;
   analyzing the data packets to determine if a subset of the data packets have been corrupted;
   suppressing transmission of the subset of data packets, at the physical layer, if the subset of data packets is determined to have been corrupted;
   determining when N consecutive data packets have been received in error at a transmitter, where N is a positive integer greater than one;
   generating random data packets after the N consecutive packets have been received; and
   substituting the random data packets, instead of suppressing transmission of the subset of data packets, for the subset of data packets when N consecutive data packets have been received in error at the transmitter.

35. The non-transitory machine readable medium of claim 34, further comprising generating random data packets for the subset of data packets or suppressing transmission of the subset of data packets if the subset of data packets is determined to be subject to a blackout requirement.

36. The non-transitory machine readable medium of claim 34, wherein the instructions further comprise:
   employing an initialization routine to determine whether suppression of transmission or substitution of random data packets are to be employed when the subset of data packets is determined to be corrupted.

37. The non-transitory machine readable medium of claim 34, wherein the instructions further comprise:
   switching between suppression of transmission and random data packet substitution according to a specific application.

38. The non-transitory machine readable medium of claim 34, wherein the instructions further comprise:
   determining at least one of Designated Market Area (DMA), a group of local transmitters, a Physical Layer Packet (PLP), a suppression of transmission, a random data packet, and a group of wide area transmitters.

39. The non-transitory machine readable medium of claim 38, wherein the instructions further comprise:
   increasing security coverage of a programming blackout by mitigating a potential attack and reducing interference of an adjacent DMA or group of local transmitters of non-blacked out content.

40. The non-transitory machine readable medium of claim 39, wherein the instructions further comprise:
   determining if an un-blacked out content is available too far into a blacked out group of local transmitters or DMA, then applying a random packet to reduce a coverage area of an adjacent market signal within a blacked out market.

41. The non-transitory machine readable medium of claim 34, wherein the instructions further comprise:
   re-enabling suppression of transmission if K consecutive valid packets have been received at the transmitter after substituting random data packets for the subset of data packets, where K is a positive integer.

42. The machine readable medium of claim 34, wherein the data packets are transmitted in an Orthogonal Frequency Division Multiplexing (OFDM) network.

43. The non-transitory machine readable medium of claim 34, further comprising employing a suppression of transmission algorithm or a random data packet substitution algorithm at one or more wireless transmitters.

44. The non-transitory machine readable medium of claim 34, further comprising employing a cyclic redundancy check (eRe), check sum, error correction code or a decryption code to determine a data corruption.

45. The non-transitory machine readable medium of claim 34, further comprising performing a suppression of transmission or a random data packet substitution at an OFDM physical layer.

46. The non-transitory machine readable medium of claim 34, further comprising generating random data packets for the subset of data packets or suppressing transmission of the subset of data packets if the subset of data packets is determined to be subject to a blackout requirement.

47. The non-transitory machine readable medium of claim 41, further comprising generating data from multiple communications links that include at least one of satellite links, terrestrial microwave links, WAN networks, and LAN wired networks.

48. The non-transitory machine readable medium of claim 41, further comprising suppressing data in a group of wide area transmitters portion of a blacked out group of local transmitter's multiplex.

49. A wireless communications processor configured to transmit wireless data packets, comprising:
a first module for receiving data packets from a wireless distribution network;
a second module for analyzing the data packets to determine if a subset of the data packets have been corrupted
a third module for suppressing transmission of the subset of data packets, at the physical layer, if the subset of data packets is determined to have been corrupted;
a fourth module for determining when N consecutive data packets have been received in error at a transmitter, where N is a positive integer greater than one;
a fifth module for generating random data packets after the N consecutive packets have been received; and
a sixth module for substituting the random data packets, instead of suppressmg transmission of the subset of data packets, for the subset of data packets when n consecutive data packets have been received in error at the transmitter.

50. The system of claim 49, further comprising:
means for employing an initialization routine to determine whether suppression of transmission or substitution of random data packets are to be employed when the subset of data packets is determined to be corrupted.

51. The wireless communications processor of claim 49, wherein the data packets are transmitted in an Orthogonal Frequency Division Multiplexing (OFDM) network.

52. The wireless communications processor of claim 49, further comprising a seventh module for switching between suppression of transmission and random data packet substitution according to a specific application.

53. The wireless communications processor of claim 49, further comprising a seventh module for employing a suppression of transmission algorithm or a random data packet substitution algorithm at one or more wireless transmitters.

54. The wireless communications processor of claim 49, further comprising a seventh module for employing a cyclic redundancy check (eRe), check sum, error correction code or a decryption code to determine a data corruption.

55. The wireless communications processor of claim 49, further comprising a seventh module for performing a suppression of transmission or a random data packet substitution at an OFDM physical layer.

56. The wireless communications processor of claim 49, further comprising a seventh module for determining at least one of Designated Market Area (DMA), a group of local transmitters, a Physical Layer Packet (PLP), a suppression of transmission, a random data packet, and a group of wide area transmitters.

57. The wireless communications processor of claim 56, further comprising an eighth module for increasing security coverage of a programming blackout by mitigating a potential attack and reducing interference of an adjacent DMA or group of local transmitters of nonblacked out content.

58. The wireless communications processor of claim 57, further comprising a ninth module for determining if an unblacked out content is available too far into a blacked out group of local transmitters or DMA, then applying a random packet to reduce a coverage area of an adjacent market signal within a blacked out market.

59. The wireless communications processor of claim 49, further comprising a seventh module for generating random data packets for the subset of data packets or suppressing transmission of the subset of data packets if the subset of data packets is determined to be subject to a blackout requirement.

60. A wireless communications apparatus, comprising:
a receiver to received data packets from a wireless distribution network; and
a processor configured to analyze the data packets to determine if a subset of the data packets are to be suppressed in view of data packet corruption; suppress transmission of the subset of data packets, at the physical layer, if the subset of data packets is determined to have been corrupted; determine when N consecutive data packets have been received in error at a transmitter, where N is a positive integer greater than one; generate random data packets after the N consecutive packets have been received, and substitute the random data packets, instead of suppressing transmission of the subset of data packets, for the subset of data packets when N consecutive data packets have been received in error at the transmitter.

61. The wireless communication apparatus of claim 60, wherein the data packets are transmitted in an Orthogonal Frequency Division Multiplexing (OFDM) network.

62. The wireless communication apparatus of claim 60, wherein the processor is further configured to employ an initialization routine to determine whether suppression of transmission or substitution of random data packets are to be employed when the subset of data packets is determined to be corrupted.

63. The wireless communication apparatus of claim 60, wherein the processor is further configured to employ a suppression of transmission algorithm or a random data packet substitution algorithm at one or more wireless transmitters.

64. The wireless communication apparatus of claim 60, wherein the processor is further configured to employ a cyclic redundancy check (CRC), check sum, error correction code or a decryption code to determine a data corruption.

65. The wireless communication apparatus of claim 60, wherein the processor is further configured to perform a suppression of transmission or a random data packet substitution at an OFDM physical layer.

66. The wireless communication apparatus of claim 60, wherein the processor is further configured to determine at least one of Designated Market Area (DMA), a group of local transmitters, a Physical Layer Packet (PLP), a suppression of transmission, a random data packet, and a group of wide area transmitters.

67. The wireless communication apparatus of claim 60, wherein the processor is further configured to increase security coverage of a programming blackout by mitigating a potential attack and reducing interference of an adjacent DMA or group of local transmitters of non-blacked out content.

68. The wireless communication apparatus of claim 67, wherein the processor is further configured to determine if an un-blacked out content is available too far into a blacked out group of local transmitters or DMA, then applying a random packet to reduce a coverage area of an adjacent market signal within a blacked out market.

69. The wireless communication apparatus of claim 60, wherein the processor is further configured to re-enable suppression of transmission if K consecutive valid packets have been received at a transmitter after substituting random data packets for the subset of data packets.

70. The wireless communication apparatus of claim 69, wherein the processor is further configured to generate data from multiple communications links that include at least one of satellite links, terrestrial microwave, WAN networks, and LAN wired networks.

71. The wireless communication apparatus of claim 69, wherein the processor is further configured to suppress data in a group of wide area transmitters portion of a blacked out group of local transmitter's multiplex.

72. The wireless communications apparatus of claim 60, wherein the processor is further configured to switch between suppression of transmission and random data packet substitution according to a specific application.

73. The wireless communications processor of claim 49, further comprising a seventh module for re-enabling suppression of transmission if K consecutive valid packets have been received at a transmitter after substituting random data packets for the subset of data packets, where K is a positive integer.

74. The wireless communications processor of claim 73, further comprising an eighth module for generating data from multiple communications links that include at least one of satellite links, terrestrial microwave links, WAN networks, and LAN wired networks.

75. The wireless communications processor of claim 73, further comprising an eighth module for suppressing data in a group of wide area transmitters portion of a blacked out group of local transmitter's multiplex.

76. The wireless communications apparatus of claim 60, wherein the processor is further configured to generate random data packets for the subset of data packets or suppress transmission of the subset of data packets if the subset of data packets is determined to be subject to a blackout requirement.

77. The wireless communication apparatus of claim 60, wherein the processor is further configured to employ an initialization routine to determine whether suppression of transmission or substitution of random data packets are to be employed when the subset of data packets is determined to be corrupted.

78. The wireless communication apparatus of claim 60, wherein the processor is further configured to increase security coverage of a programming blackout by mitigating a potential attack and reducing interference of an adjacent DMA or group of local transmitters of non-blacked out content.

79. The wireless communication apparatus of claim 78, wherein the processor is further configured to determine if an un-blacked out content is available too far into a blacked out group of local transmitters or DMA, then applying a random packet to reduce a coverage area of an adjacent market signal within a blacked out market.

80. A method for transmitting wireless data packets, comprising:
receiving data packets from a wireless distribution network;
analyzing the data packets to determine if a subset of the data packets have been corrupted;
suppressing transmission of the subset of data packets if the subset of data packets is determined to have been corrupted;
determining when N consecutive data packets have been received in error at a transmitter, where N is a positive integer greater than one;
generating random data packets after the N consecutive packets have been received; and
substituting the random data packets, instead of suppressing transmission of the subset of data packets, for the subset of data packets when N consecutive data packets have been received in error at the transmitter.

81. The method of claim 80, wherein the data packets are transmitted in an Orthogonal Frequency Division Multiplexing (OFDM) network.

82. The method of claim 80, further comprising employing an initialization routine to determine whether suppression of transmission or substitution of random data packets are to be employed when the subset of data packets is determined to be corrupted.

83. The method of claim 80, further comprising switching between suppression of transmission and random data packet substitution according to a specific application.

84. The method of claim 80, further comprising employing a suppression of transmission algorithm or a random data packet substitution algorithm at one or more wireless transmitters.

85. The method of claim 80, further comprising employing a cyclic redundancy check (CRC), check sum, error correction code or a decryption code to determine a data corruption.

86. The method of claim 80, further comprising performing a suppression of transmission or a random data packet substitution at an OFDM physical layer.

87. The method of claim 63, further comprising generating random data packets for the subset of data packets or suppressing transmission of the subset of data packets if the subset of data packets is determined to be subject to a blackout requirement.

88. A non-transitory machine readable medium having machine executable instructions stored thereon, comprising:
receiving data packets from a wireless distribution network;
analyzing the data packets to determine if a subset of the data packets have been corrupted;
suppressing transmission of the subset of data packets if the subset of data packets is determined to have been corrupted;
determining when N consecutive data packets have been received in error at a transmitter, where N is a positive integer greater than one;
generating random data packets after the N consecutive packets have been received; and
substituting the random data packets, instead of suppressing transmission of the subset of data packets, for the subset of data packets when N consecutive data packets have been received in error at the transmitter.

89. The non-transitory machine readable medium of claim 88, further comprising generating random data packets for the subset of data packets or suppressing transmission of the subset of data packets if the subset of data packets is determined to be subject to a blackout requirement.

90. The non-transitory machine readable medium of claim 88, wherein the instructions further comprise:
employing an initialization routine to determine whether suppression of transmission or substitution of random data packets are to be employed when the subset of data packets is determined to be corrupted.

91. The non-transitory machine readable medium of claim 88, wherein the instructions further comprise:
switching between suppression of transmission and random data packet substitution according to a specific application.

92. The non-transitory machine readable medium of claim 88, wherein the instructions further comprise:
determining at least one of Designated Market Area (DMA), a group of local transmitters, a Physical Layer Packet (PLP), a suppression of transmission, a random data packet, and a group of wide area transmitters.

93. The non-transitory machine readable medium of claim 92, wherein the instructions further comprise:
increasing security coverage of a programming blackout by mitigating a potential attack and reducing interference of an adjacent DMA or group of local transmitters of non-blacked out content.

94. The non-transitory machine readable medium of claim 93, wherein the instructions further comprise:
determining if an un-blacked out content is available too far into a blacked out group of local transmitters or DMA, then applying a random packet to reduce a coverage area of an adjacent market signal within a blacked out market.

95. The non-transitory machine readable medium of claim 88, wherein the instructions further comprise:
re-enabling suppression of transmission if K consecutive valid packets have been received at the transmitter after substituting random data packets for the subset of data packets, where K is a positive integer.

96. The non-transitory machine readable medium of claim 95, further comprising generating data from multiple communications links that include at least one of satellite links, terrestrial microwave links, WAN networks, and LAN wired networks.

97. The non-transitory machine readable medium of claim 95, further comprising suppressing data in a group of wide area transmitters portion of a blacked out group of local transmitter's multiplex.

98. The non-transitory machine readable medium of claim 88, wherein the data packets are transmitted in an Orthogonal Frequency Division Multiplexing (OFDM) network.

99. The non-transitory machine readable medium of claim 88, further comprising employing a suppression of transmission algorithm or a random data packet substitution algorithm at one or more wireless transmitters.

100. The non-transitory machine readable medium of claim 88, further comprising employing a cyclic redundancy check (eRe), check sum, error correction code or a decryption code to determine a data corruption.

101. The non-transitory machine readable medium of claim 88, further comprising performing a suppression of transmission or a random data packet substitution at an OFDM physical layer.

102. The non-transitory machine readable medium of claim 88, further comprising generating random data packets for the subset of data packets or suppressing transmission of the subset of data packets if the subset of data packets is determined to be subject to a blackout requirement.

103. A wireless communications processor configured to transmit wireless data packets, comprising:
a first module for receiving data packets from a wireless distribution network;
a second module for analyzing the data packets to determine if a subset of the data packets have been corrupted
a third module for suppressing transmission of the subset of data packets if the subset of data packets is determined to have been corrupted;
a fourth module for determining when N consecutive data packets have been received in error at a transmitter, where N is a positive integer greater than one;
a fifth module for generating random data packets after the N consecutive packets have been received; and
a sixth module for substituting the random data packets, instead of suppressmg transmission of the subset of data packets, for the subset of data packets when n consecutive data packets have been received in error at the transmitter.

104. The system of claim 103, further comprising:
means for employing an initialization routine to determine whether suppression of transmission or substitution of random data packets are to be employed when the subset of data packets is determined to be corrupted.

105. The wireless communications processor of claim 103, wherein the data packets are transmitted in an Orthogonal Frequency Division Multiplexing (OFDM) network.

106. The wireless communications processor of claim 103, further comprising a seventh module for switching between suppression of transmission and random data packet substitution according to a specific application.

107. The wireless communications processor of claim 103, further comprising a seventh module for employing a suppression of transmission algorithm or a random data packet substitution algorithm at one or more wireless transmitters.

108. The wireless communications processor of claim 103, further comprising a seventh module for employing a cyclic redundancy check (eRe), check sum, error correction code or a decryption code to determine a data corruption.

109. The wireless communications processor of claim 103, further comprising a seventh module for performing a suppression of transmission or a random data packet substitution at an OFDM physical layer.

110. The wireless communications processor of claim 103, further comprising a seventh module for determining at least one of Designated Market Area (DMA), a group of local transmitters, a Physical Layer Packet (PLP), a suppression of transmission, a random data packet, and a group of wide area transmitters.

111. The wireless communications processor of claim 110, further comprising an eighth module for increasing security coverage of a programming blackout by mitigating a potential attack and reducing interference of an adjacent DMA or group of local transmitters of nonblacked out content.

112. The wireless communications processor of claim 111, further comprising a ninth module for determining if an un-blacked out content is available too far into a blacked out group of local transmitters or DMA, then applying a random packet to reduce a coverage area of an adjacent market signal within a blacked out market.

113. The wireless communications processor of claim 103, further comprising a seventh module for re-enabling suppression of transmission if K consecutive valid packets have been received at a transmitter after substituting random data packets for the subset of data packets, where K is a positive integer.

114. The wireless communications processor of claim 113, further comprising an eighth module for generating data from multiple communications links that include at least one of satellite links, terrestrial microwave links, WAN networks, and LAN wired networks.

115. The wireless communications processor of claim 113, further comprising an eighth module for suppressing data in a group of wide area transmitters portion of a blacked out group of local transmitter's multiplex.

116. The wireless communications processor of claim 103, further comprising a seventh module for generating random data packets for the subset of data packets or suppressing transmission of the subset of data packets if the subset of data packets is determined to be subject to a blackout requirement.

117. A wireless communications apparatus, comprising:
a receiver to received data packets from a wireless distribution network; and
a processor configured to analyze the data packets to determine if a subset of the data packets are to be suppressed in view of data packet corruption; suppress transmission of the subset of data packets if the subset of data packets is determined to have been corrupted; determine when N consecutive data packets have been received in error at a transmitter, where N is a positive integer greater than one; generate random data packets after the N consecutive packets have been received, and substitute the random data packets, instead of suppressing transmission of the subset of data packets, for the subset of data packets when N consecutive data packets have been received in error at the transmitter.

118. The wireless communication apparatus of claim 117, wherein the data packets are transmitted in an Orthogonal Frequency Division Multiplexing (OFDM) network.

119. The wireless communication apparatus of claim 117, wherein the processor is further configured to employ a suppression of transmission algorithm or a random data packet substitution algorithm at one or more wireless transmitters.

120. The wireless communication apparatus of claim 117, wherein the processor is further configured to employ a cyclic redundancy check (CRC), check sum, error correction code or a decryption code to determine a data corruption.

121. The wireless communication apparatus of claim 117, wherein the processor is further configured to perform a suppression of transmission or a random data packet substitution at an OFDM physical layer.

122. The wireless communication apparatus of claim 117, wherein the processor is further configured to determine at least one of Designated Market Area (DMA), a group of local transmitters, a Physical Layer Packet (PLP), a suppression of transmission, a random data packet, and a group of wide area transmitters.

123. The wireless communication apparatus of claim 117, wherein the processor is further configured to re-enable suppression of transmission if K consecutive valid packets have been received at a transmitter after substituting random data packets for the subset of data packets.

124. The wireless communication apparatus of claim 123, wherein the processor is further configured to generate data from multiple communications links that include at least one of satellite links, terrestrial microwave links, WAN networks, and LAN wired networks.

125. The wireless communication apparatus of claim 123, wherein the processor is further configured to suppress data in a group of wide area transmitters portion of a blacked out group of local transmitter's multiplex.

126. The wireless communications apparatus of claim 117, wherein the processor is further configured to switch between suppression of transmission and random data packet substitution according to a specific application.

127. The wireless communications apparatus of claim 117, wherein the processor is further configured to generate random data packets for the subset of data packets or suppress transmission of the subset of data packets if the subset of data packets is determined to be subject to a blackout requirement.

\* \* \* \* \*